United States Patent [19]

Book, Sr.

[11] Patent Number: 4,853,175
[45] Date of Patent: Aug. 1, 1989

[54] POWER PLANT INTERACTIVE DISPLAY

[75] Inventor: Theodore L. Book, Sr., Lynchburg, Va.

[73] Assignee: The Babcock & Wilcox Company, New Orleans, La.

[21] Appl. No.: 166,959

[22] Filed: Mar. 10, 1988

[51] Int. Cl.$^4$ ............................................... G21C 7/36
[52] U.S. Cl. ..................................... 376/216; 376/215; 376/217; 364/138; 364/492
[58] Field of Search ..................... 376/215, 216, 217; 364/138, 492, 188, 189, 431.01

[56] References Cited

U.S. PATENT DOCUMENTS

| | | | |
|---|---|---|---|
| 4,568,513 | 2/1986 | Book | 376/245 |
| 4,803,039 | 2/1989 | Impink | 376/216 |
| 4,803,040 | 2/1989 | Gross | 376/216 |

Primary Examiner—Donald P. Walsh
Attorney, Agent, or Firm—Vytas R. Matas; Robert J. Edwards; Daniel S. Kalka

[57] ABSTRACT

An interactive display apparatus and method for a plant operating at a plurality of process parametes from which a current plant status can be calculated, and from which symptoms can be diagnosed which indicate the existence of transient conditions of plant status for which mitigating action must be taken within a time interval, utilize a central computer for storing all appropriate mitigating actions which should be taken upon the occurrence of a symptom. The computer is also programmed with algorithms for selecting and prioritizing mitigating actions that are appropriate. A display is connected to the computer for displaying the list of mitigating actions which are appropriate for a symptom diagnosed by the central computer. Sets of symptom indicators and extreme action indicators are also driven by the computer. Each symptom is represented by a separate card which can be independently illuminated to indicate the existence of that symptom. If the symptom is not corrected by appropriate mitigating action within an implied time interval, an extreme action indicator card is lit from along a plurality of extreme action indicators. This indicates to the plant personnel that now extreme action is needed. The central computer also calculates which extreme actions are needed from a list of stored extreme actions. These too are displayed to the plant operator. To help the plant operator on determining the effects of mitigating actions and the ongoing status of the plant, a separate display connected to the central computer, displays current plant status.

20 Claims, 2 Drawing Sheets

POWER PLANT INTERACTIVE DISPLAY

FIELD AND BACKGROUND OF THE INVENTION

The present invention relates in general to systems for displaying the operating parameters of power plants and, in particular, a new and useful method and apparatus for aiding the operation of a nuclear power plant during abnormal transient conditions.

Operator aids, in the form of displays, have been in use in power plants for a very long time. Indeed, the earliest power plants incorporated operator aids through use of improvised marks on water glasses, rag flags placed on vent lines, etc. Over the years, the art of providing operator aids has undergone many iterations. Today, this art is taking on new dimensions as computers are factored in.

With the coming of computers, a myriad of displays, commonly known as operator aids, have been made available. For the most part, these aids are passive and serve only to supply additional information to the plant operator. Currently, nuclear power plants utilize an operator aid known as the Safety Parameter Display System (SPDS). This SPDS is intended to relieve the operator of some diagnostic burden during periods of plant upset; this is generally a period of high stress.

When a power plant undergoes an abnormal transient, the plant operators are confronted with a complex decision making process. Recognition of this complex process led to the development of the first pressure-temperature (P-T) displays used as operator aids. This occurred during the conceptual design stage of vendor designed emergency operation guidelines (1979-1980). It was determined, at that time, that the integration of certain important data into one display could ease the operator's determination of what symptom was occurring and therefore what action to take. Operators found these displays an excellent diagnostic tool for use during plant upsets, as well as symptom identification during normal transients.

Later, it was decided that other information which would be helpful to operators during upset periods should be added to these displays. This led to the addition of protection system envelopes to these displays. Subsequent to this time, supplement 1 to NUREG-0737 was issued. This document referred to a Safety Parameter Display System (SPDS). In an effort to supply a match to this NUREG guidance, vendors added more information to the P-T displays and they were dubbed the SPDS. This is the current state of affairs relative to P-T display development.

Since the implementation of these displays, there have been several severe transients at nuclear power plants. In at least two of these transients, operators were not successful in determining when to take further, more extreme actions, they procrastinated beyond the point where action should have been taken.

In the mitigation process of any transient, there is necessarily a diagnosis and mitigation action time interval. That is, a diagnosis is made and then the appropriate action, based upon the diagnosis, is taken. Depending upon the complexity of the transient, there may be from one to very many of these diagnosis-mitigation time intervals (DM-TIs). Taken in the aggregate, these DM-TIs provide a measure of the time required to mitigate a given transient (includes time to reach stable plant conditions with normal controls in effect). Conceptually, the total transient time may be thought of as the sum of these DM-TIs, i.e.

$$\sum_{i=1}^{n} (\omega_i)(\Delta x_i).$$

The length of any DM-TI is subjective. It is based upon the operators ability to determine whether a particular action taken has been effective or not and when to continue on and take another more drastic appropriate action. Each DM-TI starts with the operators scan of vital instruments (including the SPDS) for the purpose of diagnosing plant conditions (given a symptom has been identified) and ends when an action has been completed or the transient has been mitigated, resulting in the operator's recognition of plant stability. Past experiences indicate that operators sometimes have difficulty determining if actions taken have been effective or not. Because of this, they may continue to diagnose plant conditions and proscrastinate before taking further more extreme actions. This necessarily increases the present DM-TI which in turn prolongs the overall transient time. Even more significant is the fact that procrastination in taking further action can lead to a transient of greater magnitude with its attendant consequences.

A major concern to regulators (NRC-INPO) of some vendor based Emergency Operating Procedures (EOPS) is the selection of appropriate procedures once a transient begins. The following paragraph from a recent INPO audit of NPP (nuclear power plant) EOPs sums up this point:

"The plant EOPs have little information in their diagnostic section to help the operator determine which transient is occurring. The information that is provided to the operator however, rarely references the P-T traces. In addition, most plant EOPs do not provide descriptions of the entry conditions at the start of each subprocedure, and they seem to rely heavily on the operator's ability to correctly identify a transient type (e.g., over-cooling) and select the proper subprocedure with a minimal amount of procedural direction."

This report also points out that during observed simulator exercises operators had difficulty deciding which subprocedure they should execute.

"This delayed their entering the proper procedure, and, in one case, an operator began executing an incorrect procedure before entering the correct one."

Hench U.S. Pat. No. 4,421,716 et al discloses an apparatus for monitoring critical systems of a plant and provides information as to the status and crucial systems in summary form and upon request to a plant operator. The primary display of this reference has means for prompting the Operator as to which one of a number of push-buttons to press when an abnormal condition occurs. This message informs the Operator that further information can be obtained by pressing one of the push-buttons. The Operator is not given positive guidance on appropriate actions to take, however, nor a time frame for such actions.

Mlyaczak U.S. Pat. No. 4,657,727 et al discloses means for classifying emergency events. It identifies three fission product barriers which are intended to prevent the uncontrolled release of radioactive material to the environment. It establishes functional performance criteria for each fission product barrier.

Plant emergency symptoms are recognized by a computer or by the operators. The operators then implement emergency operating procedures to mitigate the symptoms of the emergency. Symptoms which are indicative of conditions which cannot be mitigated prior to the breach of a fission product barrier are identified and the computer automatically alerts outside authorities and notifies them of the emergency classification determined by the process.

Twilley, Jr. U.S. Pat. No. 4,608,223 discloses a system for monitoring a limited number of operating conditions in nuclear reactors. The system identifies abnormal operating conditions in a pressurized water reactor nuclear power plant and monitors a limited number of specific operating conditions which are common to post-reactor trip transient control. The system parameters remain within a "post-trip window" on a graphic display if the power plant is operating normally. When any of the foregoing system parameters falls outside this "window", this is an immediate indication to the power plant operator to institute the necessary procedures to remedy the same.

Book U.S. Pat. No. 4,568,513 et al teaches a system for monitoring and displaying operating parameters of a nuclear reactor which pertains to core power distribution. A cursor on a visual display indicates positions of the axial power shaping rods. Superimposed on a display is the operational limit line which is determined by the power PT margin systems.

Barry U.S. Pat. No. 4,292,129 teaches an apparatus for monitoring the processes of the nuclear reactor. Giras U.S. Pat. No. 4,258,424 et al relates to systems and methods for operating steam turbines and to electric power plants in which generators are operated by steam turbines. Musick U.S. Pat. No. 4,080,251 discloses a method and apparatus for calculating operating units for nuclear reactors which provides the margin which must be maintained in order to allow operation of the nuclear reactor in a safe manner.

Graham U.S. Pat. No. 4,079,236 et al discloses a method and apparatus which employ parameters that are monitored outside the reactor core.

Musick U.S. Pat. No. 4,016,034 is directed to a safety system for a nuclear reactor. The system overrides the nuclear reactor's controls with the purpose of insuring that minimum conditions are present at all times in order to ensure the adequate preparation of the nuclear reactor safety system. In essence, this prevents the operation of a nuclear reactor in a prohibited power configuration by limiting the power distributions which may be created in the core of the reactor.

Musick U.S. Pat. No. 3,998,693 teaches a monitoring system for providing warning and/or trip signals indicative of the approach of the operating conditions of a nuclear steam supply system. The thermal limit locus is calculated via signals representing the reactors cold leg temperature and core power. Then, the core power signal is adjusted to compensate for the effect of both radial and axial peaking factors.

Liang U.S. Pat. No. 3,873,817 discloses a system for monitoring and evaluating the turbine system, components and instrumentation performance in a nuclear fueled electric power generating system.

None of the foregoing references are able to provide to a plant operator a positive indication of what actions are appropriate in response to transient conditions and when the DM-TI has ended so that more extreme actions can be taken. These references thus do not avoid the extensive amount of subjective reasoning required on the part of a plant operator and possibly leading to periods of procrastination.

SUMMARY OF THE INVENTION

The present invention comprises a method and apparatus for abnormal transient operator aid (ATOA) which will tell the operator to end the present DM-TI and proceed to a more extreme action. In this way, an element of subjective reasoning is removed from the plant operator. This eliminates periods of procrastination which pose potential danger in the treatment of transient emergency conditions.

The present invention provides positive guidance into the appropriate procedure to follow during abnormal transients through automated symptom identification, by providing the following functions:
 1. Activate alarm and indicate existing symptom(s); indicate what procedure(s) to use.
 2. Display all levels of actions required for each symptom.
 3. Automate control functions.

The invention also indicates when the operator should end the current DM-TI (delta $X_i$) and continue on with more extreme appropriate actions, by providing the functions:
 1. Display what these extreme actions are.
 2. Automate the execution of extreme actions.

The invention provides appropriate operations guidance during the course of a transient.

It further stores, updates and changes procedures and provides hard copies of procedures and appropriate actions to take during a transient.

Accordingly, an object of the present invention is to provide an interactive display apparatus for a plant operating at a plurality of process parameters from which a current plant status can be calculated and from which symptoms of a transient condition requiring at least one mitigating action within an implied time interval can be diagnosed, extreme action being necessary beyond the time interval if the mitigating action is unsuccessful in mitigating the transient condition, the apparatus comprising computing means for receiving signals indicative of the process parameters, the computing means being programmed with algorithms and equations for diagnosing a plurality of symptoms of transient conditions in the plant, a plurality of symptom indicators each activatable for indicating one of the plurality of symptoms, the symptom indicators being connected to the computing means for activation by the computing means upon diagnosis by the computing means of a symptom and a plurality of extreme action indicators each activatable for indicating the need for an extreme action, the extreme action indicators being connected to the computing means for activation by the computing means upon the expiration of the implied time interval for a mitigating action which has been unsuccessful in mitigating the transient condition or the expiration of a sum of implied time intervals for all mitigating actions which were unsuccessful for mitigating the transient condition.

A further object of the invention is to provide a method of interactive display for a plant operating at a plurality of process parameters which indicate the existence of symptoms requiring mitigating action and which further indicates the need for extreme action if the mitigating action has been unsuccessful in mitigating the transient condition within a selected time interval.

Further objects of the present invention are to provide methods and apparatus which utilize a central computer that stores all emergency operating procedures which can be used as mitigating actions or as extreme actions in mitigating transient conditions, as well as algorithms for selecting appropriate mitigating and extreme actions to be taken with displays for displaying and for rendering hard copies of lists of such mitigating actions in appropriate order by priority.

A still further object of the present invention is to provide methods and apparatus for updating the emergency operating procedures and for displaying and plotting current plant status, a well as changes in plant status during the course of an emergency operation for mitigating transient conditions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
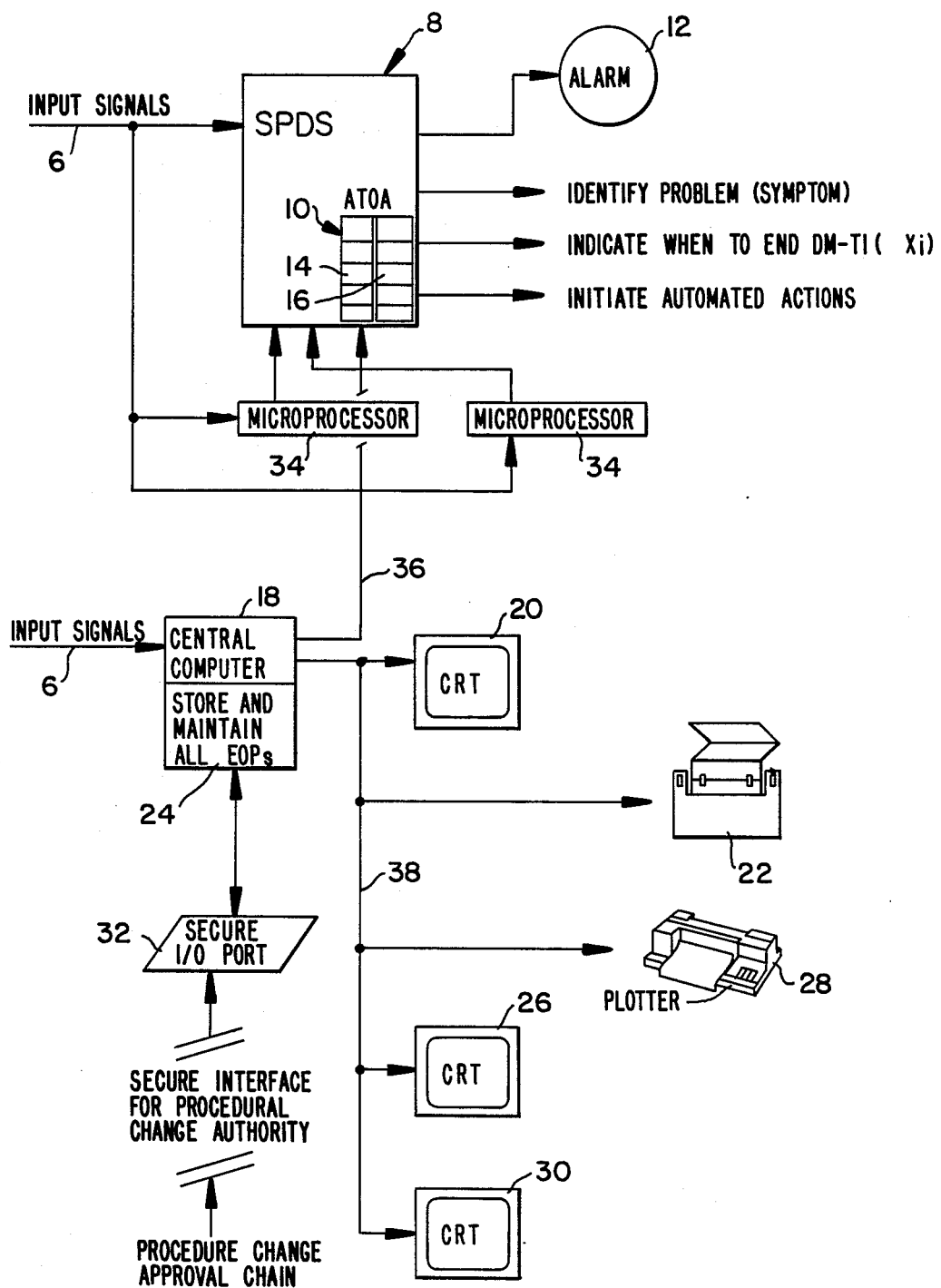
FIG. 1 is a schematic representation of the apparatus of the present invention for providing an interactive display to plant operators.

Referring to the drawings in particular, the invention embodied in FIG. 1 comprises an apparatus which is particularly useful for nuclear power plants and which provides an interactive display to plant operators that indicates correct procedures to follow for mitigating transient conditions in the operation of the plant.

The plant (not shown) operates at a plurality of process parameters from which a current plant status can be calculated and from which symptoms of a transient condition requiring at least one mitigating action within an implied time period can be diagnosed. Beyond this time interval, extreme action must be taken. This is also displayed to the plant operator.

The present invention is thus an abnormal transient operator aid (ATOA) for plant operators. The invention utilizes an ATOA display generally designated 10 which can be incorporated in a conventional safety parameter display system (SPDS) generally designated 8.

Figure 2:
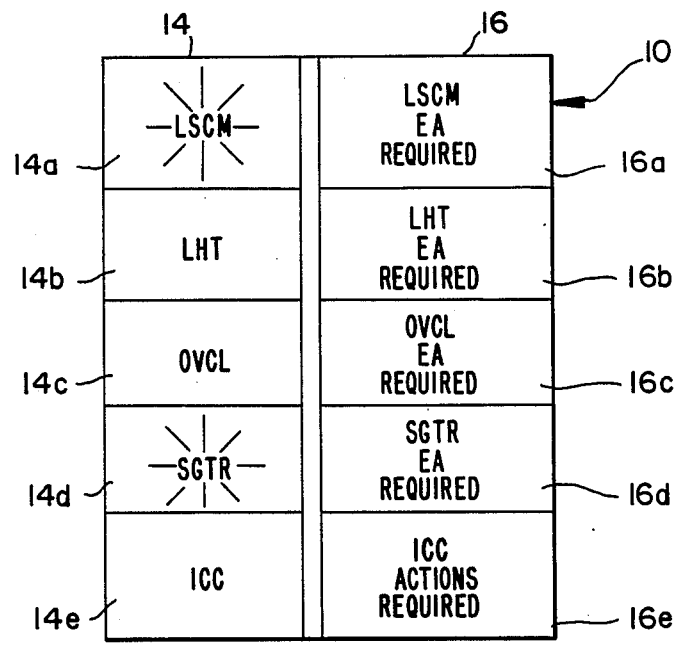
FIG. 2 is a schematic representation of an abnormal transient operator aid display, including a plurality of indicators for indicating symptoms of transient conditions and a second plurality of indicators for indicating the need for extreme actions.

As shown in FIG. 2, the ATOA display has indicators 14 to identify the following:
1. Loss of subcooling Margin (LSCM) at card 14a;
2. Loss of Heat Transfer (LHT) at card 14b;
3. Over-cooling (OVCL) at card 14c;
4. Steam generator tube rupture (SGTR) at card 14d; and
5. Inadequate core cooling (ICC) at card 14e.

When a symptom develops, the ATOA display will light the appropriate card(s) (FIG. 2 shows card 14a and 14d lit). There will also be an audible alarm at this time, by activating alarm 12.

The display 10 also provides an indication of time to take extreme action (EA) through the lighting of one or more indicators 16 when an extreme action is required. These lights or cards include the following:
1. Loss of Subcooling margin Extreme Action Required (LSCM EA) at card 16a;
2. Loss of Heat Transfer Extreme Action Required (LHT EA) at card 16b;
3. Over-cooling Extreme Action Required (OVCL EA) at card 16c;
4. Steam Generator Tube Rupture Extreme Action Required (SGTR EA) at card 16d; and
5. Inadequate Core Cooling Extreme Action Required (ICC EA) at card 16e.

When one of these cards 16a to 16e lights with its attendant audible alarm sounding again at 12, this indicates that the current DM-TI (deltaX$_i$) should end and the next action (EA) should be taken.

When either a symptom or an EA is indicated at 10, the ATOA of the invention will display all the appropriate actions to be taken. Further, should more than one symptom or EA be alarmed at once, ATOA will automatically prioritize the actions required. For example, should a SGTR rapidly lead to LSCM, both symptoms may be alarmed at the same time. In this case, ATOA would list LSCM initial actions ahead of SGTR actions because this is a higher priority symptom. This prioritization of symptoms is another problem the invention solves (see FIG. 3).

The scope of actions that can be listed by the ATOA is extensive. The entire set of operating procedures actions can be listed. If experienced operators utilize ATOA only as a backup to assure their own diagnosis, then they may want only the initial most important actions displayed. On the other hand, less experienced operators will profit from displaying a greater scope of detailed actions. The amount or number of actions to be listed can be selected in advance and these are displayed at a current actions display 20. The invention also maintains a constant display of current plant status at a display 26. This aids the operator by keeping him informed as to "where he is" at all times. That is if a mitigating action has been taken in response to the lighting of one of the cards of indicators 14 and this action succeeds in mitigating the transient condition, then this will be reflected in the changing of plant status on display 26 to show a return to normal operation.

The ATOA card display 10 of the invention can be displayed on the operator console or the SPDS 8. The actions will be displayed on CRT 20 and a hard copy can be produced on a printer 22, if desired by the plant operators. Hard copy has the advantage of allowing follow-up verification and check off by backup personnel and auxiliary operators. This capability, providing hard copy check off listings of changing action requirements, represents a new level of capability in operator aids. As conditions change, the actions required and the order of their performance may change. Since ATOA tracks the output of knowledge based algorithms, hard copy of current actions required, as well as their order of execution, is always available. This unique feature relieves the operator from having to mentally integrate several procedures and a myriad of actions into the appropriate response. Thus, operator burden is reduced assuring higher probability of successful transient mitigations.

The signals that drive the displays, the indicators and the alarm, are calculated or derived from plant parameters, such as temperature, pressure levels, flow rate, etc., which are conventionally measured at various points throughout the plant. These measurements are in the form of signals supplied on lines 6 to a central computer 18.

Computer 18 is programmed with the appropriate algorithms/equations that allow calculation of output signals to the displays. The computer samples on-line continuous signals at 6 and derives outputs for use by the displays. This same computer is sized to handle logic decisions required to provide operator actions. This logic includes expert system methodologies (e.g., heuristic algorithms) for calculating or deriving the correct lists of mitigating or extreme actions required.

Two totally redundant microprocessors 34 are included in the system. These microprocessors function independently of the central computer 18 to supply identification of symptoms and when more extreme appropriate actions are required at display 10. In this way, ATOA will always be available to perform its intended primary function. Should the central computer 18 fail, an alarm will indicate that functions below the dashed line of FIG. 1 are not available. The cards of indicators 14 and 16 will still operate however.

Examples of how signals are derived will now be given (all numerical values are typical).

1. Loss of Subcooling Margin (LSCM)

This signal is derived from combinations of RC pressure and temperature. When RCPs are off, in core T/Cs will be used. When RCPs are on, RTDs will be used. In either case, pressure will be supplied from the same source.

2. Loss of Heat Transfer (LHT)

LHT is determined by using the following signals:
(a) Steam Generator Level (SGL);
(b) Emergency Feedwater Flow Rate (EFW);
(c) Main Feedwater Flow Rate (MFW);
(d) SG Secondary Pressure, (The signal for SG secondary pressure is used to derive T saturation for the corresponding SG pressure. T saturation for the SG pressure will be used to calculate differential temperature from primary to secondary. A positive delta T will indicate that SG T saturation is less than core outlet temperature)
(e) Reactor Coolant Core Outlet Temperature (RCCOT) RTD with RCPs on and in core T/Cs with RCPs off; and
(f) Reactor Coolant Temperature at SG outlet (T cold).

The following logic is used by the computer to indicate LHT:

$$\overline{SGL} + \overline{EFW} + \overline{MFW} = LHT$$

Minimum SGL, EFW and MFW flow rates are determined, based on instrument ranges, errors, detectability, etc. For example, SGL less than 18" might be considered as no SGL ($\overline{SGL}$).

$$(+\text{delta T}) + \text{RCCOT increasing or constant} = LHT \quad (2)$$

The required +delta T must be determined. 10 F is probably a valid number; this represents about 100 PSI of SG pressure at normal operating conditions.

$$(+\text{delta T}) + \text{SG T saturation} \pm T \text{ cold} > 10 F = LHT \quad (3)$$

This signal will determine when the SG(s) are not available to remove energy during a situation where the loop(s) are interrupted due to partial voiding.

3. Over-cooling (OVCL)

This signal is derived from a combination of RCCOT rate of change and ATOA windows. The following logic will be used.

$$(C/D \text{ rate} > 100 \text{ F/HR}) + T \text{ cold} < 500 \text{ F} = OVCL:\\(PTS) \quad (4)$$

$$T \text{ cold} < \text{limit of ATOA post trip windows} = OVCL \quad (5)$$

$$C/D \text{ rate} > 100 \text{ F/HR} . \quad (6)$$

4. Steam Generator Tube Rupture (SGTR)

This signal is derived from the main steam line radiation and the condenser off gas monitors.

5. Inadequate Core Cooling (ICC)

This signal is derived from the in core T/Cs. Superheated temperature will indicate ICC.

Based on the algorithms in computer 18, operation action statements (OAS) will be calculated for display on 20 and 26 and supplementary information, such as logic charts, flow diagrams, rules, etc. will also be generated for use by the operator on display 30.

These are all displayed on CRT(s) or other equivalent display devices in the control room.

Figure 3:
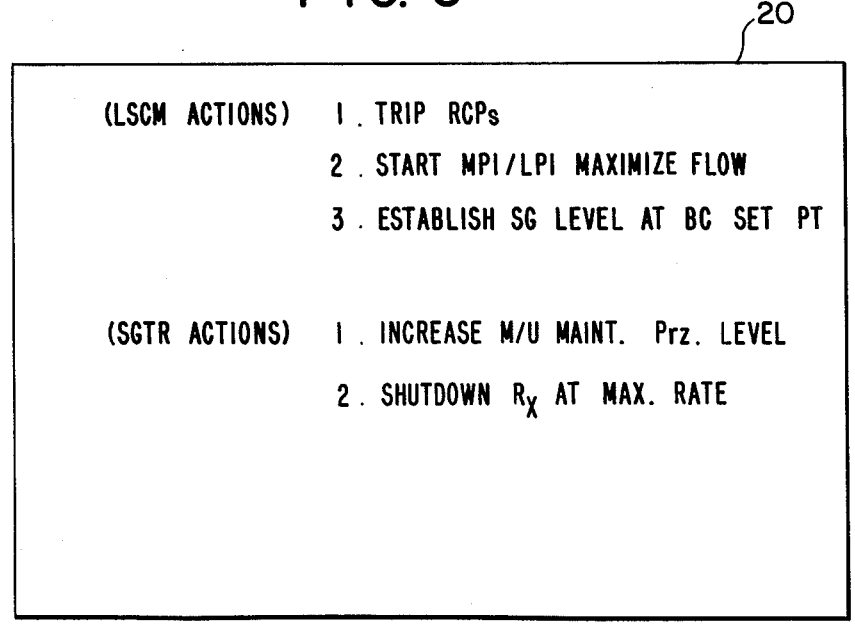
FIG. 3 is a schematic representation of a display of appropriate mitigating actions to be taken for mitigating a transient condition.

FIG. 3 shows an example of an OAS on display 20 in proper priority, where both the LSCM at 14a and the SGTR at card 14d has let.

ATOA also stores data and provides a retrace of chosen parameters. The retrace is intended to aid shift technical and control room personnel in determining what has happened and auditing the chosen course of action. This is available on trace display 30 and a plotter 28.

The ATOA central computer 18 stores all operating procedures and provides for maintenance of these procedures. It provides hard copy of any procedure required for use, thus eliminating the need for the large hard copy library currently found in or near NPP control rooms.

Because ATOA can update any procedure immediately, use of outdated procedures caused by lengthy procedure change processes are also eliminated. Procedures are changed through a secured input/output (I/0) port 32 to the ATOA computer 18. This is accessed through a procedure change approval chain and secure interface for procedural change authority to avoid unauthorized changes.

The invention thus solves many problems of known display apparatus for plants, in particular, NPPs.

Operators must decide which procedure to use during an abnormal transient (emergency operations). In the past, operators have sometimes chosen the wrong procedure. ATOA solves this problem by providing positive indication of which procedure(s) operators should use.

During the process of a complex transient, plant operators must sometimes make subjective decisions relative to taking more extreme actions. These actions, although appropriate, once taken may jeopardize certain equipment, induce large financial expenditures, require a lengthy outage, etc. Because of this, or the operator's inability to recognize the need to take more extreme actions, procrastination and inaction may occur. Should this happen (in the past operators have failed to continue on and take more extreme actions), the consequence to public safety and financial assets can be disastrous. ATOA solves this problem by providing positive indication of when to end the current DM-TI (delta $X_i$) and continue on with next appropriate more extreme action. In this way, an element of subjective decision making is removed from the operator. During the course of an abnormal transient (emergency operations) conditions and, therefore, required actions, can change constantly. Because of this, operators must track several procedures and a myriad of actions during the course of an abnormal transient. They must recognize the need to change direction and take a different set of actions as conditions change. Further prioritization of these actions and their order of execution must be determined. For these reasons, operators can and have become confused as to where they are (in the procedures) and what is going on. ATOA solves this problem by utilizing its knowledge based system to constantly update and display the current appropriate actions and their order of execution. Further, to eliminate confusion, ATOA maintains a current plant status display.

Currently, procedures are stored in hard copy, in or near the plant control room. This presents several problems. One is the space requirement. ATOA will store all plant procedures, thus eliminating the need for large hard copy procedure libraries in or near the control room. Another problem is that pages are often inadvertently ripped from procedures when shuffling through files. This can cause an operator to unknowingly use an inaccurate procedure. This problem is eliminated by the ATOA of the present invention.

ATOA also solves the problem of untimely procedure update reaching the control room. When a change to a procedure is approved by station management, it will be immediately updated to the control room through the secured I/0 port in ATOA system.

ATOA provides positive indication as to what procedures the operator should use during an abnormal transient (emergency operations).

ATOA tells the operator when to end the current DM-TI (delta $X_i$) and continue on to the next appropriate step. This will eliminate operator procrastination or inaction in the event the operator does not recognize the need to take further action.

ATOA alarms and indicates when adverse reactor core heat transfer conditions exist. When ATOA makes this determination, it also displays the appropriate actions that should be taken. Further, ATOA has the ability to automate many required actions. The use of ATOA will prevent reactor core damage, such as was sustained at TMI II in 1979. Current plant status will also be displayed.

ATOA provides immediate hard copy of procedures for use by plant personnel during emergency and normal operations. During abnormal transient (emergency) operations, the hard copy output will follow the knowledge based system logic. This will allow hard copy of any change of required action and their order of execution as the transient progresses.

All plant procedures are stored and updated in the central computer. A secured port allows procedure addition and change. A large hard copy procedure library in the control room is not required.

ATOA includes a knowledge based system to provide the appropiate actions that should be taken. The logic algorithms utilized by this system are unique to ATOA. They will supply the operator with information, actions and automated responses that will prevent reactor core, as well as equipment damage. Further, they will enhance the protection of public health and safety.

A system such as the ATOA of the invention, that can significantly decrease the probability of rector core and other plant equipment damage, will reduce risk significantly; financial risk, as well as health risk. At TMI II (Three Mile Island II), alone, over half a billion dollars may have been saved, not to mention much mental stress, to the public and its attendant deleterious social effects. A system such as ATOA should reduce public concern, insurance rates and operating costs.

Current systems used in this manner tend to be passive. That is, they provide indication and alarm only. ATOA is interactive. It tells the operator what procedure to use, where to go and what action to take. After actions are taken, it re-reads the data to update what additional actions the operator should take and in what order he should take them. Further, it has the capability to automatically perform actions when required directly from the SPDS, when one of the extreme action indicators 16 lights.

The alternative to the major attribute of this invention (operator guidance during emergency), would be to have a group of experts on shift twenty-four hours/day. They would be highly versed in the fields, including, but not limited to:

Normal Plant Operation;
Emergency Plant Operation;
Heat Transfer;
Fluid Flow;
Thermal-Hydraulics;
Nuclear Physics and Engineering; and
Mechanical Engineering.

While a specific embodiment of the invention has been showed and described in detail to illustrate the application of the principles of the invention, it will be understood that the invention may be embodied otherwise without departing from such principles.

The invention claimed is:

1. An interactive display apparatus for a plant operating at a plurality of process parameters from which a current plant status can be calculated, and from which symptoms of a transient condition in the plant status requiring at least one mitigating action an implied time interval can be diagnosed, extreme action being necessary beyond the time interval if the mitigating action is unsuccessful in mitigating the transient condition, the apparatus comprising:

computer means for receiving signals indicative of the process parameters and for diagnosing a plurality of symptoms of transient conditions in the plant status, said computer means operating to measure the time interval for each mitigating action;

a plurality of symptom indicators connected to said computer means, each symptom indicator being activatable by said computer means upon the diagnosis by said computer means of one of the symptoms; and a plurality of extreme action indicators connected to said computer means, each extreme action indicator being activatable by said computer means upon expiration of the time interval for taking a mitigating action.

2. An apparatus according to claim 1, including an alarm connected to said computer means for activation upon the diagnosis of a symptom and upon the expiration of an implied time interval.

3. An apparatus according to claim 1, wherein said computer means comprises a central computer for storing all mitigating and extreme actions for the plurality of symptoms and for the time intervals, said central computer being programmed for selecting at least one appropriate mitigating action for each symptom and at least one extreme action for each expiration of an implied time interval within which each mitigating action is required, and a current action display connected to said central computer for displaying all appropriate mitigating and extreme actions currently required.

4. An apparatus according to claim 3, including a current plant status display connected to said central computer for displaying the current plant status, whereby transient conditions in the plant status are continually provided to an operator.

5. An apparatus according to claim 3, including printer means connected to said central computer for printing hard copies of the mitigating actions displayed on said current action display.

6. An apparatus according to claim 3, including a trace display connected to said central computer for displaying plant status over time for providing a trace of changes in the plant status.

7. An apparatus according to claim 6, including plotting means connected to said central computer for plotting plant status over time.

8. An apparatus according to claim 3, including a secured input/output port connected to said central computer for reprogramming selection of the mitigating and extreme actions and for changing the mitigating and extreme actions, said secured port providing access only to authorized programming therethrough.

9. An apparatus according to claim 3, including an alarm connected to said computing means for activation upon activation of any of said symptoms and extreme action indicators.

10. An apparatus according to claim 9, wherein said computer means includes at least one microprocessor for receiving the signals which are indicative of the process parameters, independently of said central computer, said microprocessor being programmed for activating said symptom indicators and for activating said extreme action indicators upon diagnosis of said symptoms and expiration of said implied time interval.

11. An interactive display method for a plant operating at a plurality of process parameters from which a current plant status can be calculated and from which symptoms of a transient condition requiring at least one mitigating action within a certain time interval can be diagnosed, extreme action being necessary beyond the time interval if the mitigating action is unsuccessful in mitigating the transient condition, the method comprising:

diagnosing the existence of a symptom for a transient condition in the plant status among a plurality of symptoms which indicate transient conditions in the plant status;

activating a separate symptom indicator for the symptom diagnosed from among a plurality of symptom indicators, each for indicating the presence of one of the plurality of symptoms;

measuring a time interval from the time of diagnosis to the time when mitigating action must mitigate the transient condition; and at the expiration of said time interval, activating one extreme action indicator corresponding to the extreme action needed from among a plurality of extreme action indicators, each for indicating the presence of one of the extreme actions.

12. A method according to claim 11, including activating an alarm simultaneously with activation of any of said symptom indicators and any of said extreme action indicators.

13. A method according to claim 11, including storing a plurality of mitigating and extreme actions which are appropriate for all of said plurality of symptoms in a central computer, and, upon diagnosis of a symptom, displaying at least one mitigating action appropriate to said diagnosed symptom on a current action display, whereby a plant operator viewing said current action display is provided with a list of appropriate mitigating action to take to mitigate the transient condition.

14. A method according to claim 13, including displaying the current plant status on a current plant status display, whereby a plant operator can continually view the current status of the plant to determine the existence or mitigation of a transient condition.

15. A method according to claim 13, including printing out a hard copy of the current action display.

16. A method according to claim 13, including displaying the plant status over time on a trace display for providing an operator with an indication of the effects of mitigating actions on the transient conditions in the plant status.

17. A method according to claim 16, including plotting the plant status over time for providing a hard copy of traces of the plant status and effects of mitigating actions on the transient conditions.

18. A method according to claim 13, including activating an alarm upon activation of any of the symptom and extreme action indicators.

19. A method according to claim 13, including securing access to programming in the central computer for permitting changing of the list of mitigating and extreme actions and changing the programming for selecting mitigating and extreme actions for each symptom, only through a secured channel.

20. A method according to claim 19, including providing at least one redundant microprocessor, in addition to the central computer, for activating the symptom and extreme action indicators independently of the central computer.

* * * * *